United States Patent
Grosvenor et al.

(10) Patent No.: US 6,930,687 B2
(45) Date of Patent: Aug. 16, 2005

(54) METHOD OF DISPLAYING A DIGITAL IMAGE

(75) Inventors: David Arthur Grosvenor, Bristol (GB); Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 10/078,818

(22) Filed: Feb. 19, 2002

(65) Prior Publication Data

US 2002/0118287 A1 Aug. 29, 2002

(30) Foreign Application Priority Data

Feb. 23, 2001 (GB) .............................................. 0104589

(51) Int. Cl.[7] .............................................. G06T 15/70
(52) U.S. Cl. ...................... 345/473; 345/421; 345/441; 345/502; 348/239; 348/222.1; 382/225; 312/225
(58) Field of Search .......................... 312/225; 382/225; 348/239, 222.1; 345/441, 421, 502, 473, 672, 723, 719

(56) References Cited

U.S. PATENT DOCUMENTS 5,128,711 A * 7/1992 Terashita et al. .............. 355/41

6,256,061 B1 * 7/2001 Martin et al. ............. 348/222.1
6,362,850 B1 * 3/2002 Alsing et al. ................ 348/239
6,404,925 B1 * 6/2002 Foote et al. ................. 382/224
6,535,639 B1 * 3/2003 Uchihachi et al. .......... 382/225
6,573,907 B1 * 6/2003 Madrane ...................... 345/719
6,587,119 B1 * 7/2003 Anderson et al. ........... 345/672
6,633,309 B2 * 10/2003 Lau et al. .................... 345/723

FOREIGN PATENT DOCUMENTS

| JP | 11185051 A | 7/1999 | ........... G06T/13/00 |
| WO | WO 97/31482 | 8/1997 | ........... H04N/7/15 |
| WO | WO 00/08853 | 2/2000 | ........... H04N/7/00 |

* cited by examiner

*Primary Examiner*—Kimbinh T. Nguyen
(74) *Attorney, Agent, or Firm*—Thomas, Kayden, Horstemeyer & Risley, LLP

(57) ABSTRACT

A computer system 1 comprises a processor 3 connected to a memory 5. The processor 3 receives image data, representing a displayable static photograph, through an input port 7, generates a set of video data by means of an application program 11 and outputs the video data to a display 9. The video data generated by the application program 11 provides a displayable video programme representing a displayable moving viewpoint over the static photograph. The application program 11 initially analysis the displayable content of the photograph and identifies characteristics, such as regions of interest or dominant lines, curves or edges, and depending on the characteristics, identifies the photograph as belonging to a particular image class. The video data is generated in accordance with rules for that particular image class.

36 Claims, 4 Drawing Sheets

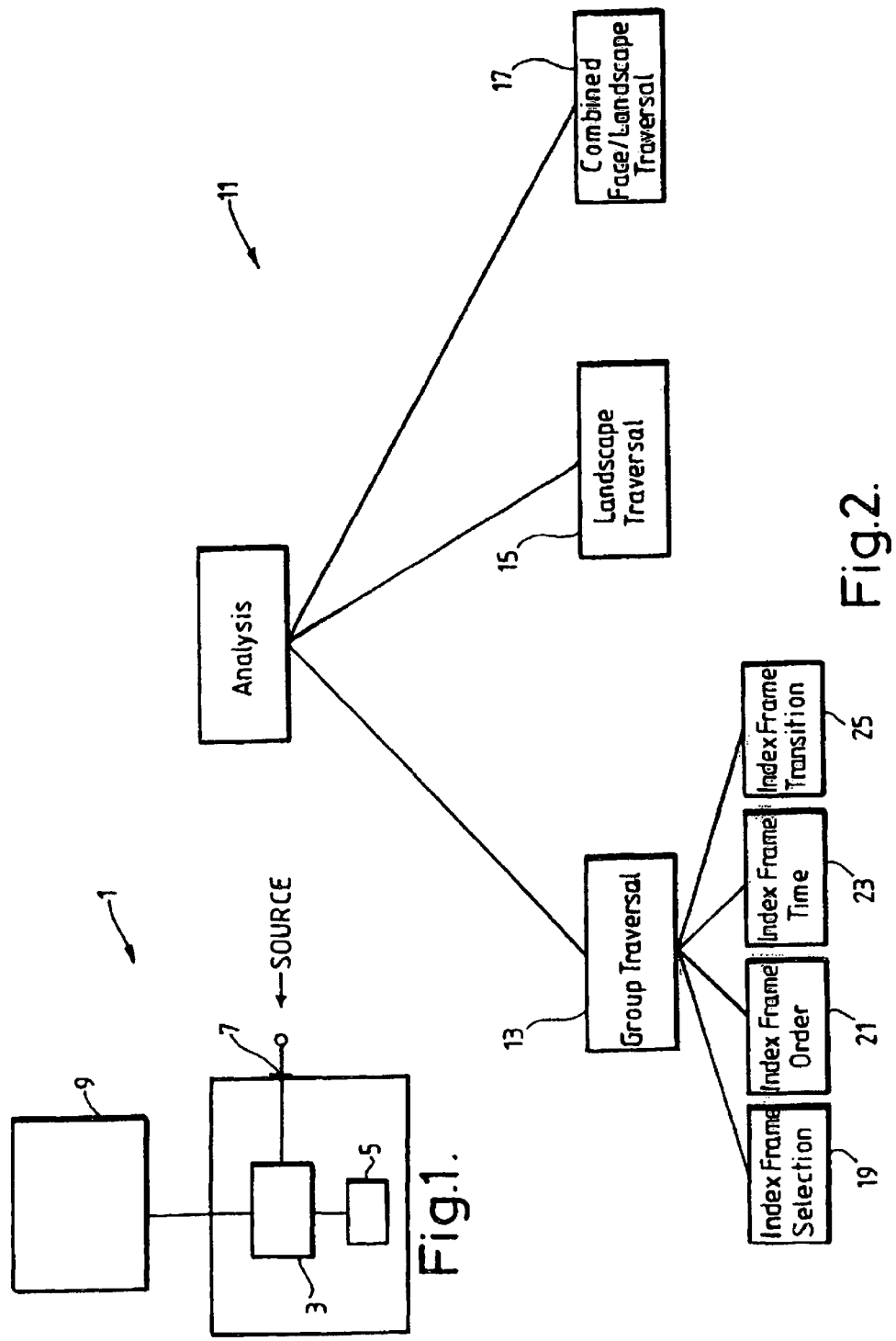

METHOD OF DISPLAYING A DIGITAL IMAGE

FIELD OF THE INVENTION

This invention relates to a method of displaying a digital image.

BACKGROUND OF THE INVENTION

Static images are increasingly being stored in digital form, for example in computer memories. This is partly due to the increase in use of computer scanners and digital camera equipment. One of the main advantages of providing an image, e.g. a photograph, in digital form, is that it can be edited on a computer, displayed on a computer screen, or, with suitable equipment, displayed on a television screen.

Owing to the fact that such digital images (as with all static images) inherently hold a viewer's attention for a limited period of time, methods have been devised for producing a moving image from a static image. Such methods are commonly referred to as 'rostrum camera' techniques. A conventional rostrum camera is a film or television camera mounted vertically on a fixed or adjustable column, typically used for shooting graphics or animation—these techniques for producing moving images are of the type that can typically be obtained from such a camera. Essentially, these techniques involve different parts of the static image being displayed over time to provide an overall motion effect 'over' the image. For example, a perceivable panning motion from one part of the image to another might be employed. As a further example, a zooming effect might be used. The main purpose of using such rostrum camera techniques is to generate continued interest in an image by converting a static image into a moving image (or rather, a series of consecutive static images so arranged to represent motion). Rostrum camera techniques also have advantages in terms of displayable resolution. By moving over an image, detail of an image can be shown that otherwise cannot be shown on a low resolution display (without zooming-in).

Such conventional rostrum camera techniques are generally manual, in that they require a user to observe the displayed image, and manually to plot the path or order of the image parts to be displayed in a moving sequence. This can be time consuming, and requires some technical knowledge of camera equipment or digital image editing software. In order to provide a good-quality moving image, particularly for photographs of real-life scenes, some knowledge of photographic composition is also required. This is clearly disadvantageous to an average person who wishes to add some degree of interest and variation to, say, a still photograph.

Basic automation of rostrum camera techniques are provided in a few digital image editing packages, such as 'Photo-Vista' from MGI Software Corp. Such a package provides a virtual moving viewpoint of a static digital image by moving from one side to the other, by moving in a wave like motion, or by displaying random parts (much like a screensaver slide-show). However, no account is taken of the image content, and no photographic composition (even at a basic level) is accounted for.

In many conventional techniques, computer memory is taken-up with displaying uninteresting parts of images and of those image parts that are considered significant or interesting, only small sections may be shown with a 'cutting-off' effect. Also, in terms of digital examples, large amounts of time and computational resources are used.

SUMMARY

According to a first aspect of the present invention, there is provided a method of displaying a digital image, the method comprising: acquiring a set of image data representative of a displayable static image; performing an analysis of the image data using a processing means to identify characteristics of the image content; and generating, in the processing means, a set of video data for output to a display, the video data representing displayable motion over the static image and being generated in accordance with the image content characteristics.

The method provides an effective way of automatically producing a moving viewpoint over an otherwise static image, with the video data (representing the moving viewpoint) being dependant on characteristics of the image content. Thus, what is actually shown in the static image is taken into account when generating the moving viewpoint. This provides for a much more effective video sequence and allows the layman to produce highly effective results without any knowledge of photographic composition. Computer memory is used more efficiently to display those parts of the image in which the person viewing is likely to be interested.

It will be appreciated that the video data generated can be of any digital video format, and may make use of some of the more structured or interactive video playback formats which are emerging in the field. The video data need not simply relate to a stream of frames which are played sequentially, but could also relate to video programmes where a viewer can browse the programme in a non-sequential manner. This is possible in a format called Synchronised Media Integration Language (SMIL). This format allows identification of clips and other structure so that the viewer can jump around the video. Preferably, the step of performing an analysis of the image data comprises determining which of a number of predefined image characteristics are present in the image, and the step of generating the video data comprises executing an algorithm associated with those characteristics identified, the algorithm defining a rule or rules for generating a moving viewpoint over the image for display.

The step of performing an analysis of the image may further comprise identifying a predefined image class wherein, in that image class, sub-parts of the image have predefined characteristics, and establishing index frames based on a close-up view of each identified sub-part, the step of generating the video data comprising executing an algorithm for determining a display path from one index frame to the next. In the step of generating the video data, the algorithm may further determine one or more of (a) the order of the index frames to be displayed, (b) the amount of time for which each index frame is displayed, and (c) the nature of the transition between each index frame.

The step of identifying the predefined image class having sub-parts with predefined characteristics may comprise identifying regions of interest and performing a feature recognition operation. The step of performing feature recognition may identify human facial features, the step of establishing index frames thereafter comprising forming index frames based on a close-up view of the facial features. Having identified human facial features, the step of performing feature recognition may further comprise comparing the facial features with a database of pre-stored facial features such that the step of forming index frames is performed only for those facial features already present in the database. The step of generating the video data to establish a display path can comprise determining the orientation of the facial features, and generating a display path which follows the general gaze direction which the facial features exhibit.

As an alternative to the index-frame method above, the step of performing an analysis of the image may further comprise identifying a predefined image class wherein, in that image class, there are one or more dominant edges, lines or curves, the step of generating the video data comprising executing an algorithm for determining a display path following the one or more dominant edges, lines or curves.

Further, the step of performing an analysis of the image data may further comprise: (a) identifying a predefined image class wherein, in that image class, there are both (i) image sub-parts having predefined characteristics, and (ii) dominant edges, lines or curves; and (b) establishing index frames based on a close-up view of each identified image sub-part in (i), the step of generating the video data comprising executing an algorithm for determining a display path moving between each index frame and following the dominant edges, lines or curves.

In the step of generating the video data, the algorithm may define rules having a first level and at least one sub-level, the rules in the first level relating to identification of a predefined image class, and the rules in the at least one sub-level relating to options for generating the moving viewpoint for the image class identified. The method may further comprise prompting the user manually to select an option in a sub-level.

The step of generating the video data may comprise generating video data for a plurality of video sub-clips, each sub-clip representing displayable motion over a different part of the static image, and wherein the method further comprises an editing step for linking the sub-clips to form a second set of video data.

The above method finds particular application where the image data is representative of a displayable photograph.

According to a second aspect of the present invention, there is provided a computer program stored on a computer-usable medium, the computer program comprising computer-readable instructions for causing the computer to execute the steps of: acquiring a set of image data representative of a displayable static image; performing an analysis of the image data using a processing means to identify characteristics of the image content; and generating, in the processing means, a set of video data for output to a display, the video data representing displayable motion over the static image and being generated in accordance with the image content characteristics.

According to a third aspect of the present invention, there is provided a computer system comprising a processing means, a data port and a video port, the processor being arranged to receive image data representative of a displayable static image from the data port, and wherein the processing means is further arranged to access and to perform an analysis of the image data to identify characteristics of the image content, and to generate a set of video data representing displayable motion over the static image according to the image content characteristics, the processor being arranged to output the video data to the video port for display.

BRIEF DESCRIPTION OF THE DRAWINGS

The invention will now be described, by way of example, with reference to the accompanying drawings in which:

FIG. 1 is a block diagram representing a computer system for running a computer program according to the invention;

FIG. 2 is a block diagram representation of a set of rules within the computer program for generating video data from a static image;

DETAILED DESCRIPTION OF THE PREFERRED EMBODIMENTS

Figure 3A:
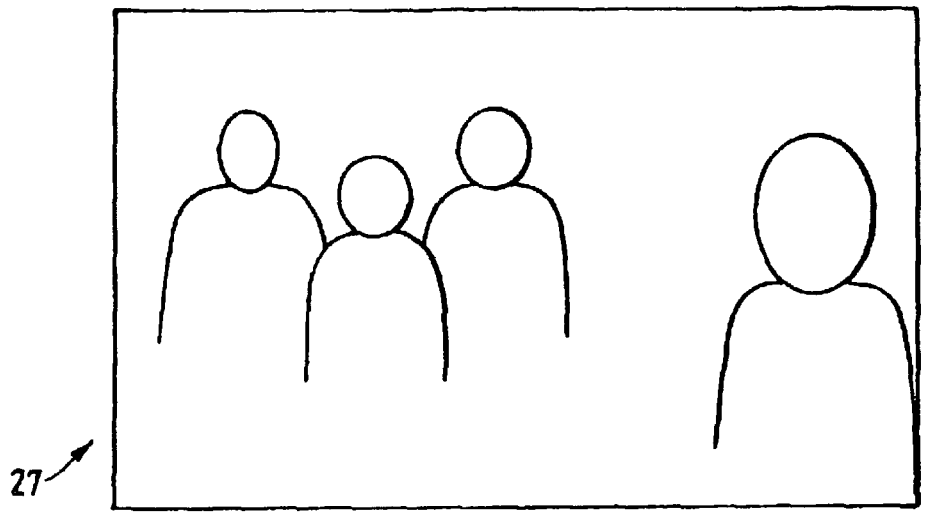
FIGS. 3a to 3d represent the stages of forming a video programme from a static photograph depicting a group of people.

A first embodiment of the invention is shown in FIG. 1. Referring to FIG. 1, a computer system 1 comprises a processor 3 connected to a memory 5. The processor 3 receives data via an input port 7 and outputs data to a display 9, such as a monitor. In this case, the input port 7 receives image data from an image source, for example a scanner or a digital camera. The image data received represents a static image, here a photograph, and is stored in the memory 5. Also stored in the memory 5 is an application program 11 for generating a set of "video data" from the image data. The video data generated by the application program 11 provides a displayable "video programme" representing a displayable moving viewpoint over the static image. This video programme can thereafter be viewed on the display 9. It will be appreciated that such a video programme will actually be composed of a plurality of separate static images so sequenced to give the motion effect. For ease of explanation the terms video data and video programme will be referred to.

Once the acquired image data is stored in the memory 5, the application program 11 is launched, and the location of the file holding the image data specified to the program. The program 11, operating under the control of the processor 3, then performs an analysis of the image data such that particular characteristics of the image content (i.e. that content which can be viewed in two dimensions on a display) are identified. The application then proceeds to generate the abovementioned video data based on the identified image content characteristics. To facilitate this, the application program 11 includes an algorithm comprising a set of rules for determining how the video programme should display a moving viewpoint based on the different characteristics identified.

In the present embodiment, the analysis stage of the application program 11 initially identifies which one of a plurality of predefined image classes the image data stored actually represents. Given that the intended image data relates to photographs, three image classes are provided in the program 11, namely (a) a face/group traversal class, (b) a landscape traversal class, and (c) a combined face/landscape traversal class.

In (a), i.e. the face/group traversal class, the analysis stage of the application program 11 uses standard image analysis techniques to identify so-called 'regions of interest'. Such techniques effectively involve processing the image data to decompose and find 'interesting' points within the image. As an example, such a technique might include identifying and segmenting regions having substantially uniform texture and colour. A further known method is to perform face detection whereby human facial features are identified. This latter method is used in the application program 11 to identify facial features within the image data belonging to one or more persons captured in a photograph. Assuming one or more faces are identified, the program 11 establishes 'index frames' of those faces based on a zoomed-in view of the face.

In the next phase of the application program 11, i.e. the video data generation stage, a display path is established, which effectively represents the moving viewpoint over or between the one or more index frames that the video data will produce when displayed. As explained briefly above, the application program 11 comprises an algorithm, or set of rules, many of which are based on photographic composition techniques for producing appropriate and interesting effects according to the image content. Thus, for example, where one face is identified in an image, the video data may represent an overview shot, showing the entire image, followed by a zooming-in effect to the face. Where one or more faces are identified, the overview may be followed by a panning motion between each index frame (hence group traversal class), if necessary, incorporating zooming-in and zooming-out effects to take account of some faces being closer than others. Of course, various other rules may be applied to obtain suitable motion effects. These will be discussed in more detail below.

In (b), i.e. the landscape traversal class, the analysis stage of the application program 11 identifies dominant edges, curves or lines in an image. For example, in a landscape scene having hills and mountains in the distance, the program 11 identifies the dominant edges, curves or lines (i.e. as being significantly more dominant than any particular region of interest, if any are present) and so knows to operate in this class in the video data generation stage. In this stage, the video data generated will follow the general path of the dominant edges, curves or lines in the image (hence landscape traversal class). As with the group traversal class, other rules may be applied to provide more sophisticated motion effects.

In (c), i.e. the combined face/landscape traversal class, the analysis stage identifies image data representing an image having both (i) one or more regions of interest and (ii) a dominant edge, line or curve. In effect, it combines the analysis stages of (a) and (b) above. In this case, the video data generation stage will plot a path for showing the identified regions of interest whilst also following the general path of the edge, line or curve. This is a slightly more complex task, but all the same, provides for interesting moving image effects.

FIG. 2 shows a block diagram representing the general operation of the application program 11. As described above, in the initial analysis stage, the program 11 establishes into which of the three classes the image data falls. Having performed this, the video generation stage will proceed to operate according to the predefined algorithm, or set of rules, belonging to the class identified (and represented as blocks 13, 15 and 17). Sub-rules are provided which are used to determine how the video data will be generated in that class. In FIG. 2, sub-rules are shown and described with respect to the group traversal class only, although it will be appreciated that suitable sub-rules may be formulated for the landscape traversal and combined face/landscape transversal classes.

An example image is shown in FIG. 3a, the image representing a photograph 27 of a group of people. In the analysis stage of the application program 11, regions of interest are identified in the image firstly by identifying areas having consistent colour and texture, and then by identifying the facial features. The program 11 then makes the decision that this image must belong to the group traversal class since it contains a number of distinct regions of interest (although it should be noted that even a single face or other region of interest would fall into this class also). Having decided on the appropriate image class, the program 11 proceeds to generate a video programme based on the sub-rules shown in FIG. 2.

Figure 3B:
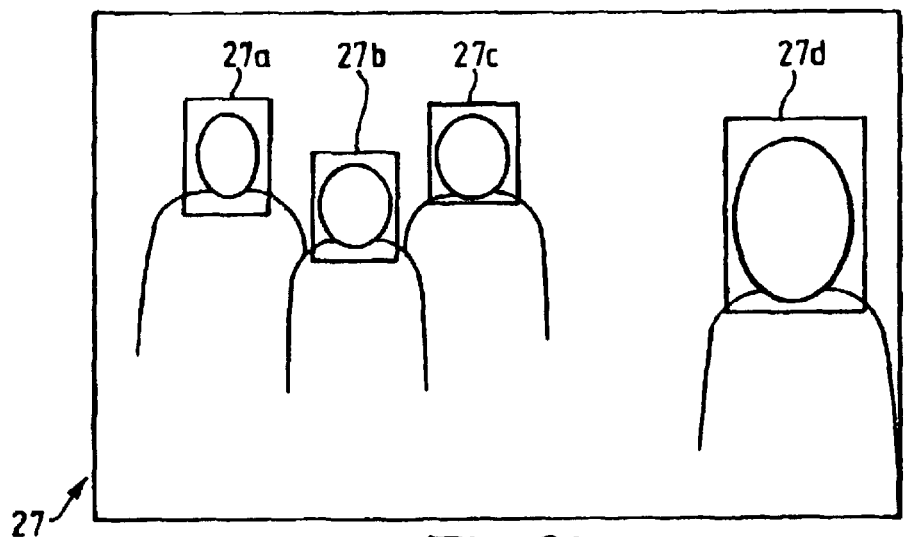

Referring back to FIG. 2, the first sub-rule 19 in the group traversal class relates to index frame selection. This selection is used to derive a set of still frames, or index frames. Having identified that there are a number of faces in the analysis stage, the obvious choice is to use a close-up version of each face as the index frames. This is illustrated in FIG. 3b, where index frames are represented as 27a–27d. However, it should be appreciated that the choice of index frames may encompass more sophisticated selection rules based on photographic composition techniques. These would comprise extra sub-levels (not shown) depending from the index frame selection rule in FIG. 2. Such selection techniques are described in the applicant's co-pending International Patent Application No. GB01/05683 entitled "Automated Cropping of Electronic Images", filed on 20 Dec. 2001, the contents of which are incorporated herein by reference. Image content features that are relevant to composition include face identification (used in this example), person identification (i.e. comparing an identified face with a database of pre-stored faces and using only recognised faces as index frames), gaze direction (faces appearing to look at each other providing interesting subjects), avoiding flat, boring and strongly contrasting areas, avoiding light areas adjacent the edges of the image etc.

Figure 3C:
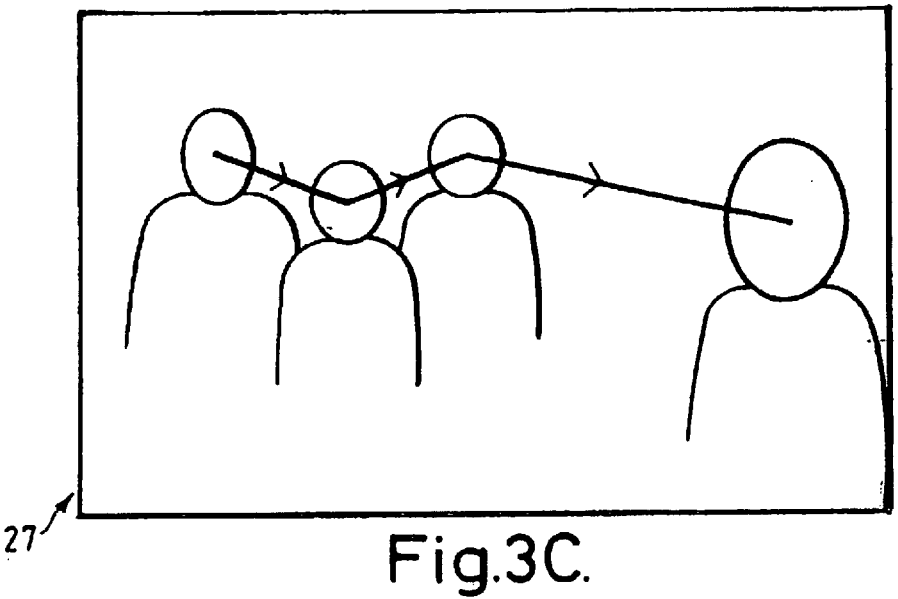
Figure 3D:
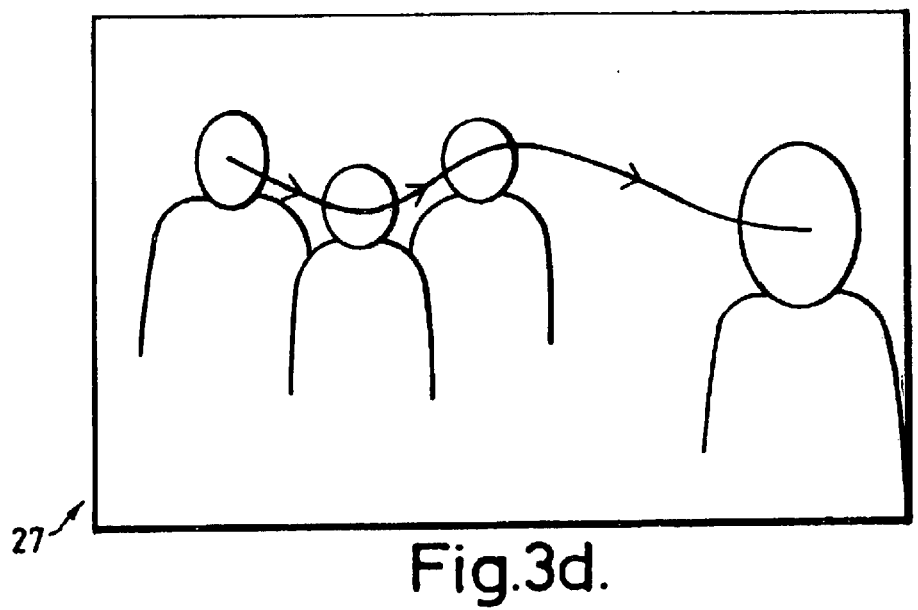

The second sub-rule 21 relates to the order in which the index frames will be shown. In the example shown, the rule 21 simply stipulates that a panning effect will take place from left to right, passing over each index frame in turn. This is shown in FIGS. 3c and 3d. Since the face on the extreme right hand side of the image is nearer, and so bigger, a zooming effect is used.

Further examples include the order following other rules of composition, for example, starting with an overview shot encompassing several regions of interest, and then showing detailed views of each region of interest. The overview shot sets the location and gives atmospheric effect. Another approach might withhold the location information from the user or audience to give some dramatic effect, the individual index frames being shown first before revealing the overview shot, i.e. by zooming-out. The ordering of index frames could follow the geometry of the scene. If the scene had shown a group of people in rows, e.g. a school photograph, the order could start from the top left of the scene, move rightwards, then down, and then leftwards to end at the bottom left person. Detecting the gaze of people (mentioned above) in the scene can be used to plot a suitable path over the image. Some degree of suspense can be generated since the viewer will wonder what the person is looking at. The part of the image the people are actually looking at can be kept out of view until the end.

The main effects which generate reaction from a viewer, and so are taken into account in this sub-rule, include panning for indicating spatial relationships between two or more index frames (cutting effects do provide the same sense of continuity). Tilting upwards creates feelings of rising interest and emotion, expectancy, hope or anticipation. Tilting downwards is allied to lowering of interest and emotion, disappointment, sadness or critical inspection. Zooming-in or zooming-out indicates the viewer's behaviour towards the subject. Rhythmic or jerky zooms should be avoided, so any zooming effect should be used with care.

The third sub-rule 23 determines the time period for which each index frame 27a–27d is displayed. As the video programme moves between the index frames 27a–27d, the camera will linger at each index frame prior to moving to the next, in this case rightwards, index frame. The longer the time period, the more time the viewer is able to look at the detail in the index frame 27a–27d. Ultimately, the time spent viewing each index frame 27a–27d will depend on the number of index frames and the total time allotted to the video, say 20 seconds. For example, each index frame 27a–27d could be viewed static for approximately 2 seconds before the viewpoint moves to the next index frame. Of course, it is possible to use repeated views of the index frames 27a–27d.

The fourth sub-rule 25 determines the nature of the movement between the index frames 27a–27d. This movement can vary according to the route (determined by the order) and the rate of movement (to some extent, determined in the previous stage). In FIG. 3c, the motion between the index frames 27a–27d is formed by straight lines between the centre of each index frame. In FIG. 3d, a smoother, less jerky path is formed. The path could follow some structure in the image. Another approach is to use a single line as a path through the people, with the size of the frame sufficient to capture all of the people of interest whilst panning the scene. In this sense, displayable resolution is compromised to some extent for smooth camera motion. A simple way of performing this would be to fit a line through a series of points (known as 'least squares fitting'). So, if a group of people were shown, a point could be made on each person (say, their left eye). Next, a frame size is used which is sufficient to include each of the people (plus some margin space) when the camera viewpoint is at the point on the line closest to the fitted line. Complexity occurs when there are multiple rows of people of different sizes. One might try to fit several lines. If the variation in size is too great, then the frame size will become too large and the effect of seeing detail will be lost.

Other arrangements for panning between people or faces can be arranged. For example, if the application program 11 recognises people around an object, such as a table (e.g. with people along both longitudinal sides of the table, and at the opposite end to the viewpoint, then fitting horizontal lines to the image will result in a video programme that zig-zags across the table. However, by fitting three sides of a trapezium to points on the people, the camera viewpoint will move around the table, producing a much more desirable result.

Generally speaking, the speed of transition between index frames may depend on the amount of interest in the regions between index frames. Panning slowly across uninteresting areas can prove annoying to the viewer. The panning should be smooth, with erratic or hesitant panning avoided. A fast pan moving rapidly from one index frame to the next causes the intermediate region to appear blurred. As the viewer's attention is moved rapidly to the next index frame, it gives it (the next frame) a transitory importance.

Figure 4:
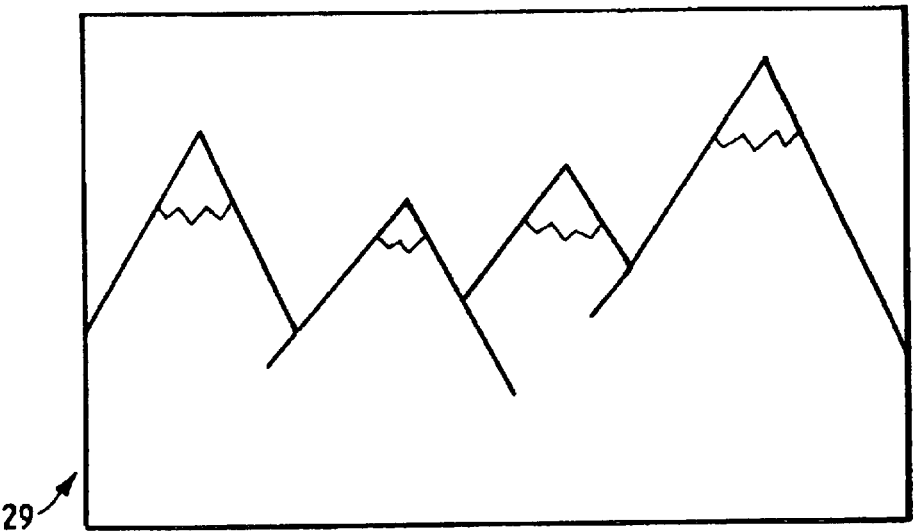
FIG. 4 represents a photograph showing a landscape scene.

A further example image is shown in FIG. 4, the image representing a photograph 29 of a mountain range. In the analysis stage of the application program 11, no identifiable regions of interest are identified in the image, however, a dominant line is detected in the form of the mountain extremes contrasting with the background. The program 11 then makes the decision that this image must belong to the landscape traversal class since it contains no distinct regions of interest but there is a dominant line. Having decided on the appropriate image class, the program 11 proceeds to generate a video programme based on sub-rules (not shown in FIG. 2). At the most basic level, the video programme shows a panning motion following the dominant edge (i.e. a zig-zag motion). Sub-rules may determine the direction and speed of motion.

Figure 5:
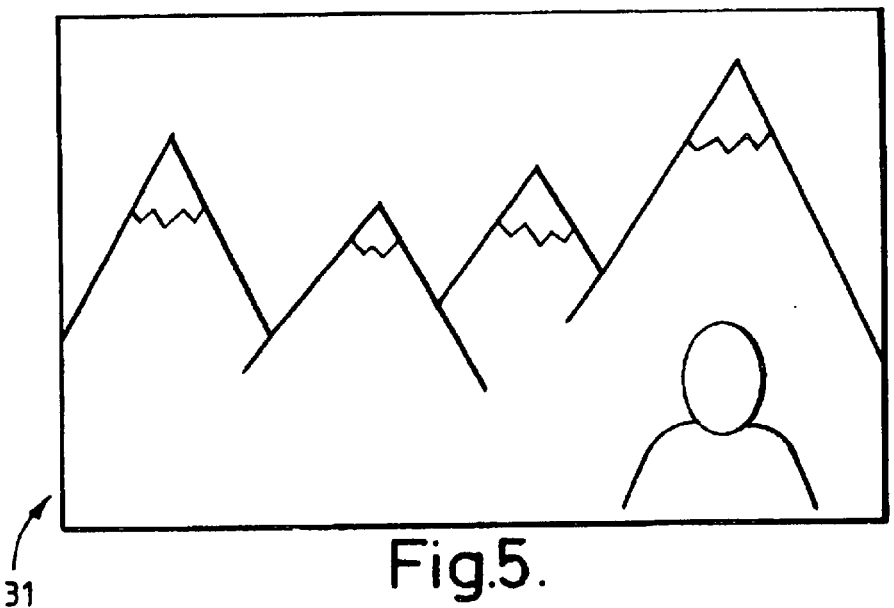
FIG. 5 represents a photograph showing a landscape scene with a subject being in the foreground.

A third example image is shown in FIG. 5, the image representing a photograph 31 of a mountain range with a person positioned in the foreground. In the analysis stage of the application program 11, one identifiable region of interest is identified in the image, namely the face. However, a dominant line is also detected in the form of the mountain extremes contrasting with the background (as in the previous example). The program 11 makes the decision that this image belongs to the combined face/landscape traversal class. Having decided on the appropriate image class, the program 11 proceeds to generate a video programme based on suitable sub-rules (not shown in FIG. 2). Again, the video programme may show a panning motion following the dominant edge which zooms-out to show the index frame of the face. Alternatively, the reverse motion can be applied.

In the above embodiment, the application program 11 produces a video programme automatically from the image data. However, in second and third embodiments some interaction is provided in the application program 11. This interaction allows a user to analyse and assist the specification of the moving viewpoint.

In the second embodiment (first interactive example), the application program 11 is used (in its automatic mode) to produce an initial video programme. This video programme is then used for analysis purposes and subsequent interaction. For example, index frames can be added or removed. The order of traversal of the index frames can be changed. The zoom around the index frames can also be altered. The application program 11 provides an interface whereby these interactive options can be made. For example, a button can be used to signal that the viewable frame should zoom-in or zoom-out on a particular position. The rate of movement can also be altered. A button could also be used to speed up or to slow down the movement between index frames.

In the third embodiment (second interactive example), having decided on the image class in the analysis stage, instead of proceeding to generate the video data, the user is prompted to make certain decisions with respect to the sub-rules shown in FIG. 2. For example, the user may indicate a point of interest in the image, the system thereafter using segmentation to deduce the region of interest and the required frame. The automated part of the application program 11 can then calculate a suitable path for a viewpoint over the image using the or each region of interest. The order can also be specified. As a specific example, in the group traversal class 13, the user may be prompted to select or deselect some of the identified index frames 27a–27d, to specify the order of the index frames, to vary the time for which each index frame is specified, or to specify the nature of transition between each index frame. Although this may reduce the composition effects pre-specified in the program 11, a user is able to make some choices to suit individual requirements.

In a fourth embodiment, a number of separate video programmes are generated within a single image for subsequent editing to form an overall video programme. For example, a moving viewpoint could be automatically generated for two or more different parts of the image. In the editing stage, the transition between the two programmes can be specified manually.

In a fifth embodiment, the application program 11 is specifically arranged to analyse image data relating to photographs, and uses motion (in this example, panning) to overcome some aspect ratio mismatches between the photograph and the visual display. This is useful since photographs tend to have different aspect ratios to conventional television screens. This means that if the whole photograph is displayed, there will be unused areas of the screen. This is a particular problem for portrait mode photographs. In this embodiment, the image data is analysed to detect the salient parts of the image. These are then used to form an overview frame. This overview frame forms the first and last frame of the video sequence. The application program 11 generates a video sequence which is a panning effect about the image in such a way that it ends with the salient image. The panning action ensures that the whole image can be viewed.

In all the above embodiments, use can be made of known visual techniques, such as fades, cuts, and dissolves, to join separate video clips together.

It should be appreciated that there can be provided several implementation strategies for the computer system 1. The first case is where the image data is acquired and analysed in real-time and the video data generated on demand. The second case is where the viewpoint path, scale and frame rate information is stored after the analysis of the image is performed. In a third example, the whole of the image data can be sub-sampled to obtain a number of resolutions forming, effectively, a pyramid of images, as well as storing all viewpoint information. Since sub-sampling is computationally expensive caching them in advance is advantageous. The fourth case simply generates a complete video stream that can be played back sequentially.

Such a method and system for displaying digital images enables interesting and effective video sequences to be generated from otherwise static images. Less computer memory is occupied with image data which represents those areas which are of little of no interest to the viewer.

What is claimed is:

1. A method of displaying a digital image, the method comprising:
   acquiring a set of image data representative of a displayable static image;
   using a processing means to perform an analysis of the image data to identify characteristics of the image content to determine which of a number of predefined image characteristics are present in the image;
   identifying, by executing an algorithm in the processing means, a predefined image class wherein, in that image class, there is at least one dominant edge, line or curve;
   executing an algorithm, in the processing means, associated with those characteristics identified, the algorithm defining a rule or rules for generating a moving viewpoint over the image for display to determine the moving viewpoint without input from a user;
   executing an algorithm in the processing means, for determining a display path following the at least one dominant edge, line or curve using the determined moving viewpoint; and
   generating, in the processing means, a set of video data for output to a display device connected to the processing means, the video data representing displayable motion over the static image and being generated in accordance with the image content characteristics.

2. A method according to claim 1, wherein the step of performing an analysis of the image further comprises identifying a predefined image class wherein, in that image class, sub-parts of the image have predefined characteristics, and establishing index frames based on a close-up view of each identified sub-part, the step of generating the video data comprising executing an algorithm for determining a display path from one index frame to the next.

3. A method according to claim 2, wherein, in the step of generating the video data, the algorithm further determines at least one of (a) the order of the index frames to be displayed, (b) the amount of time for which each index frame is displayed, and (c) the nature of the transition between each index frame.

4. A method according to claim 2, wherein the step of identifying the predefined image class having sub-parts with predefined characteristics comprises identifying regions of interest and performing a feature recognition operation.

5. A method according to claim 4, wherein the step of performing feature recognition identifies human facial features, the step of establishing index frames thereafter comprising forming index frames based on a close-up view of the identified facial features.

6. A method according to claim 5, wherein, having identified human facial features, the step of performing feature recognition further comprises comparing the facial features with a database of pre-stored facial features such that the step of forming index frames is performed only for those facial features already present in the database.

7. A method according to claim 5, wherein the step of generating the video data to establish a display path comprises determining the orientation of the facial features identified, and generating a display path which follows the general gaze direction which the facial features exhibit.

8. A method of displaying a digital image, the method comprising:
   acquiring a set of image data representative of a displayable static image;
   using a processing means to perform an analysis of the image data to identify characteristics of the image content to determine which of a number of predefined image characteristics are present in the image, wherein performing an analysis of the image further comprises:
   (a) identifying a predefined image class wherein, in that image class, there are both (i) image sub-parts having predefined characteristics, and (ii) dominant edges, lines or curves; and
   (b) establishing index frames based on a close-up view of each identified image sub-part in (i);
   executing an algorithm, in the processing means, associated with those characteristics identified, the algorithm defining a rule or rules for generating a moving viewpoint over the image for display to determine the moving viewpoint without input from a user;
   executing an algorithm, in the processing means, for determining a display path moving between each index frame and following the dominant edges, lines or curves using the determined moving viewpoint; and
   generating, in the processing means, a set of video data for output to a display device connected to the processing means, the video data representing displayable motion over the static image and being generated in accordance with the image content characteristics.

9. A method according to claim 8, wherein, in the step of generating the video data, the algorithm defines rules having a first level and at least one sub-level, the rules in the first level relating to identification of a redefined image class and the rules in the at least one sub-level relating to options for generating the moving viewpoint for the image class identified, the method further comprising prompting the user manually to select an option in a sub-level.

10. A method to claim 8, wherein the step of generating the video data comprises generating video data for a plurality of video sub-clips, each sub-clip representing displayable motion over a different part of the static image, and wherein the method further comprises an editing step for linking the sub-clips to form a second set of video data.

11. A method according to claim 8, wherein the image data is representative of a displayable photograph.

12. A method according to claim 11, wherein the generated video data is representative of a panning motion over the photograph, the initial and end frames representing salient parts of the image.

13. A computer program stored on a computer-usable medium, the computer program comprising computer-readable instructions for causing the computer to execute the steps of:
  acquiring a set of image data representative of a displayable static image;
  analyzing the image data to identify characteristics of the image content;
  determining a dominant edge, line or curve corresponding to the identified characteristics of the image content;
  defining a rule or rules for generating a moving viewpoint over the image for display to determine the moving viewpoint without input from a user;
  determining a display path moving between each index frame, the display path following the determined dominant edge, line or curve using the determined moving viewpoint; and
  generating video data representing displayable motion over the static image and being generated in accordance with the image content characteristics, the video data generated by following the display path from one index frame to the next.

14. A computer system comprising:
  a data port that receives image data representative of a displayable static image;
  a processor that:
    analyzes the received image data to identify characteristics of the image content;
    determines a dominant edge, line or curve corresponding to the identified characteristics of the image content;
    defines a rule or rules for generating a moving viewpoint over the image for display to determine the moving viewpoint without input from a user;
    determines a display path moving between each index frame, the display path following the determined dominant edge, line or curve using the determined moving viewpoint; and
    generates a set of video data for output to a display device, the video data representing displayable motion over the static image and being generated in accordance with the image content characteristics; and
  a video port that outputs the video data for display.

15. A computer program stored on a computer-usable medium, the computer program comprising computer-readable, instructions for causing a computer to execute the steps of:
  acquiring a set of image data representative of a displayable static image;
  determining a plurality of index frames corresponding to regions of interest of the static image;
  determining an order of display of the plurality of index frames;
  defining a rule or rules for generating a moving viewpoint over the image for display to determine the moving viewpoint without input from a user;
  determining a display path moving between each index frame using the determined moving viewpoint, the display path following the determined order of display; and
  generating video data representing displayable motion over the static image and being generated in accordance with image content characteristics, the video data generated by following the display path from one index frame to the next.

16. The computer program of claim 15, further comprising computer-readable instructions for causing the computer to execute the step of determining the order of display of the plurality of index frames by panning for one side of the static image to the other side of the static image.

17. The computer program of claim 15, further comprising computer-readable instructions for causing the computer to execute the steps of:
  determining a geometry of a scene of the static image; and
  determining the order of display of the plurality of index frames by following the determined geometry of the scene.

18. The computer program of claim 15, further comprising computer-readable instructions for causing the computer to execute the steps of:
  displaying the generated video data;
  displaying the static image with the index frames indicated thereon; and
  displaying the display path thereon.

19. The computer program of claim 18, further comprising computer-readable instructions for causing the computer to execute the steps of:
  receiving an instruction for a user selecting a zoom for one of the plurality of index frames; and
  determining a size of display of the selected index frames, the size corresponding to the selected zoom.

20. The computer program of claim 18, further comprising computer-readable instructions for causing the computer to execute the steps of:
  receiving an instruction for a user selecting a rate of movement between the index frames; and
  determining a nature of transition between the index frames, the transition corresponding to the selected rate of movement.

21. The computer program of claim 15, further comprising computer-readable instructions for causing the computer to execute the steps of:
  selecting at least one smaller index frame; and
  zooming-in on the selected index frame to increase display sized of the index frame.

22. The computer program of claim 15, further comprising computer-readable instructions for causing the computer to execute the steps of:
  selecting at least one larger index frame; and
  zooming-out on the selected index frame to increase display sized of the index frame.

23. The computer program of claim 15, further comprising computer-readable instructions for causing the computer to execute the step of displaying the static image by zooming out from a last index frame after the last index frame is displayed.

24. The computer program of claim 15, further comprising computer-readable instructions for causing the computer to execute the steps of:

determining a time period for display of the index frames, the time period predefined for the computer program; and displaying each of the index frames for the determined time period before moving to a next index frame.

25. The computer program of claim 15, further comprising computer-readable instructions for causing the computer to execute the step of determining the display path by moving between a center of each index frame.

26. The computer program of claim 15, further comprising computer-readable instructions for causing the computer to execute the steps of:

determining a point on a person shown in each of the index frames; and determining the display path by moving between the determined points.

27. The computer program of claim 15, further comprising computer-readable instructions for causing the computer to execute the steps of:

recognizing an object around which the index frames are located; and determining the order by fitting the index frames to a trapezoid such that the direction of display is around the recognized object.

28. A computer program stored on a computer-usable medium, the computer program comprising computer-readable instructions for causing the computer to execute the steps of:

acquiring a set of image data representative of a displayable static image;

determining a plurality of index frames corresponding to regions of interest of the static image;

determining an order of display of the plurality of index frames;

determining a display path moving between each index frame, the display path following the determined order of display;

generating video data representing displayable motion over the static image and being generated in accordance with image content characteristics, the video data generated by following the display path from one index frame to the next;

displaying the generated video data;

displaying the static image with the index frames indicated thereon;

displaying the display path thereon;

receiving an instruction for a user deleting one of the plurality of index frames; and determining a second order of display of the plurality of remaining index frames such that the deleted index frame is not displayed.

29. A computer program stored, on a computer-usable medium, the computer program comprising computer-readable instructions for causing the computer to execute the steps of:

acquiring a set of image data representative of a displayable static image;

determining a plurality of index frames corresponding to regions of interest of the static image;

determining an order of display of the plurality of index frames;

determining a display path moving between each index frame, the display path following the determined order of display;

generating video data representing displayable motion over the static image and being generated in accordance with image content characteristics, the video data generated by following the display path from one index frame to the next;

displaying the generated video data;

displaying the static image with the index frames indicated thereon;

displaying the display path thereon;

receiving an instruction for a user changing the order of display of one of the plurality of index frames; and determining a second order of display of the index frames corresponding to the changed order.

30. A computer program stored on a computer-usable medium, the computer program comprising computer-readable instructions for causing the computer to execute the steps of:

acquiring a set of image data representative of a displayable static image;

determining a plurality of index frames corresponding to regions of interest of the static image;

determining an order of display of the plurality of index frames;

determining a display path moving between each index frame, the display path following the determined order of display;

generating video data representing displayable motion over the static image and being generated in accordance with image content characteristics, the video data generated by following the display path from one index frame to the next;

detecting a direction of gaze of at least one person in a scene of the static image, wherein the person is gazing at an object of interest shown on the static image; and determining the order of display by displaying an index frame corresponding to the person and then displaying the object of interest where the direction of gaze of the person is directed at.

31. A method of displaying a digital image, the method comprising:

acquiring a set of image data representative of a displayable static image;

determining a plurality of index frames corresponding to regions of interest of the static image;

determining an order of display of the plurality of index frames;

determining a display path moving between each index frame, the display path following the determined order of display;

generating video data representing displayable motion over the static image and being generated in accordance with image content characteristics, the video data generated by following the display path from one index frame to the next;

displaying the generated video data;

displaying the static image with the index frames indicated thereon;

displaying the display path thereon;

receiving an instruction for a user changing the order of display of one of the plurality of index frames; and determining a second order of display of the index frames corresponding to the changed order.

32. The method of claim 31, further comprising:

receiving an instruction for a user selecting a zoom for one of the plurality of index frames; and determining a size of display of the selected index frames, the size corresponding to the selected zoom.

33. The method of claim 31, further comprising:

receiving an instruction for a user selecting a rate of movement between the index frames; and determining a nature of transition between the index frames, the transition corresponding to the selected rate of movement.

34. The method of claim 31, further comprising determining the order of display of the plurality of index frames by panning for one side of the static image to the other side of the static image.

35. The method of claim 31, further comprising:

determining a geometry of a scene of the static image; and determining the order of display of the plurality of index frames by following the determined geometry of the scene.

36. A method of displaying a digital image, the method comprising:

acquiring a set of image data representative of a displayable static image;

determining a plurality of index frames corresponding to regions of interest of the static image;

determining an order of display of the plurality of index frames;

determining a display path moving between each index frame, the display path following the determined order of display;

generating video data representing displayable motion over the static image and being generated in accordance with image content characteristics, the video data generated by following the display path from one index frame to the next;

detecting a direction of gaze of at least one person in a scene of the static image, wherein the person is gazing at an object of interest shown on the static image; and determining the order of display by displaying an index frame corresponding to the person and then displaying the object of interest where the direction of gaze of the person is directed at.

* * * * *